Jan. 13, 1959     H. N. WOEBCKE     2,868,631
GASIFICATION PROCESS
Filed April 21, 1953
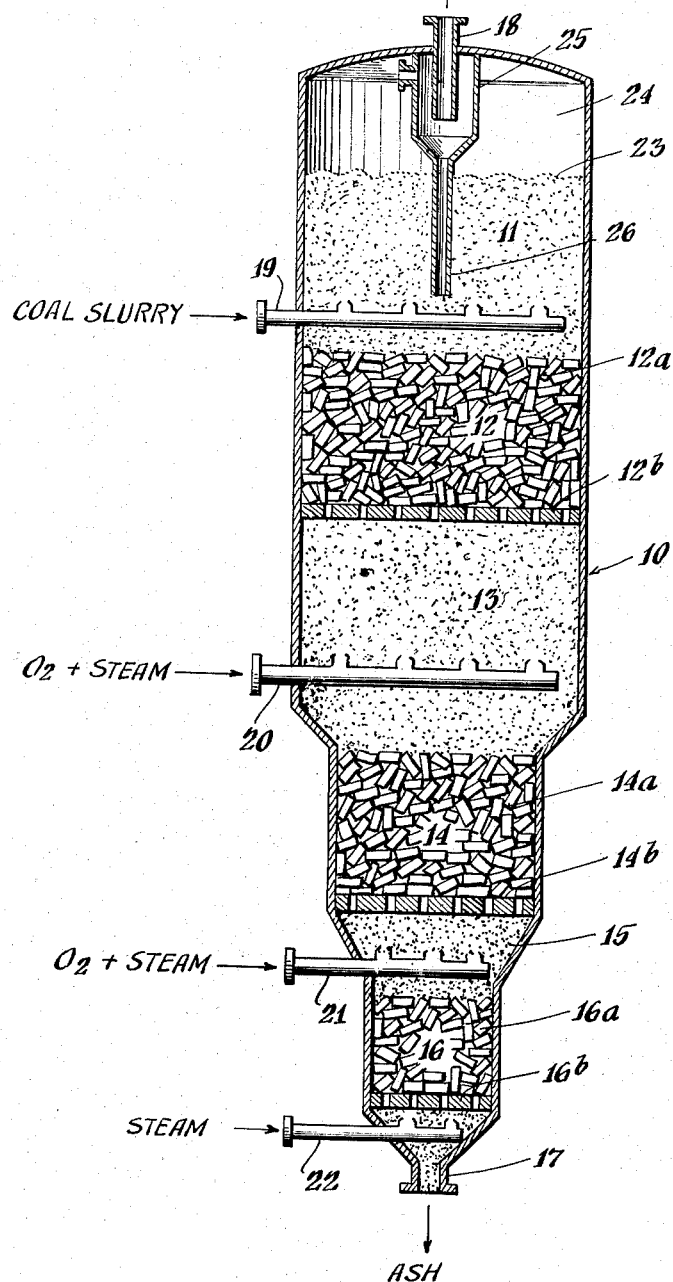
INVENTOR.
Herman N. Woebcke
BY
Paul W. Garbo
AGENT United States Patent Office 2,868,631
Patented Jan. 13, 1959

2,868,631

GASIFICATION PROCESS

Herman N. Woebcke, Emerson, N. J., assignor to Hydrocarbon Research, Inc., New York, N. Y., a corporation of New Jersey Application April 21, 1953, Serial No. 350,108

9 Claims. (Cl. 48—206)

This invention relates to a process for the gasification of carbonaceous material and more particularly to the substantially complete gasification of carbonaceous material with a high ash and high moisture content. It is especially applicable to finely divided carbonaceous materials which have low sale values relative to their B. t. u. contents.

In terms of B. t. u. content, coal cleaning wastes, such as the fine middlings and tailings, are among the lowest value carbonaceous materials. Anthracite silt, for example, has up to 30% by weight of ash, poor grindability, poor ignition properties, and issues from a coal cleaning plant as a mud or in a water slurry. Other finely divided low value materials are coke breeze and lignites.

Many methods have been proposed for the gasification of solid carbonaceous materials. The fluidized bed technique has been proposed and is particularly adapted to the treatment of finely divided materials which do not have any tendency to agglomerate under reaction conditions. One of the more notable of these fluidized bed processes is disclosed by P. W. Garbo in copending application Serial No. 30,023, filed May 29, 1948, now Patent No. 2,683,657, this invention being in the nature of an improvement thereover. Fluidized gasification processes are not well adapted to the economical treatment of carbonaceous materials of high ash and high moisture content because moisture and ash commonly bring about the loss of thermal energy from the gasification process at the cost of the carbonaceous material undergoing gasification.

An object of this invention is to provide a fluidized gasification process which can efficiently treat a water slurry of carbonaceous material.

A further object is to provide a fluidized gasification process which discards an ash with a low content of carbon and efficiently recovers sensible heat in the ash.

Briefly stated, this invention comprises injecting a slurry of carbonaceous solids and water into a fluidized mass of the same solids in a drying zone wherein the water of the slurry is vaporized, passing the solids down through a preheat zone of restrained fluidization into a fluidized primary gasification zone wherein a major portion of the carbon in the solids is gasified with oxygen and steam, passing the partially decarbonized solids from the primary gasification zone downwardly through a secondary gasification zone of restrained fluidization to remove therein substantially all of the remaining carbon in the solids, and finally passing the residue solids or ash downwardly through a cooling zone of restrained fluidization to recover sensible heat from the ash. At least a portion of the steam required for the gasification flows upwardly through the cooling zone to abstract sensible heat from the ash, a minor portion of the oxygen required for the gasification is admixed with the superheated steam discharging from the cooling zone and the oxygen and steam admixture is passed upwardly through the secondary gasification zone, additional oxygen and steam are mixed with the gasiform effluent from the secondary gasification zone and the resulting mixture flows upwardly through the primary gasification zone, the gasiform effluent from the primary gasification zone passes upwardly through the preheat zone into the drying zone wherein it mixes with steam generated by the injected aqueous coal slurry to form a total gasiform effluent that is withdrawn from the drying zone.

In the drying and the primary gasification zones, the solid particles are maintained in freely fluidized condition; a superficial linear gas velocity of generally 0.25 to 2.5, and preferably 0.4 to 1, feet per second is provided in these zones. The top-to-bottom mixing, characteristic of freely fluidized beds, maintains the composition and temperature of the solids substantially uniform throughout the fluidized bed.

In the preheat, the secondary gasification and the cooling zones of restrained fluidization, the solid particles are only permitted limited vertical movements by the presence of a fixed bed of packing bodies, e. g., 2-inch Raschig rings. Materials or devices of the type designated as "packing" or "trays" as are commonly utilized in fractionation, absorption or solvent extraction, are effective in providing the desired restrained fluidization. The selected packing must withstand the conditions to which it is exposed. Obviously, undue restriction of solids flow through the restrained fluidization zones would interfere with the efficiency of the process. It has been found that the free horizontal area in the restrained fluidization zones should, for best results, be 50 to 80% of the total horizontal area. This is particularly so when Raschig rings are employed. Restrained fluidization not only impedes top-to-bottom mixing but also permits countercurrent contact passage of gas and solid particles as well as the maintenance of temperature and/or composition gradients along the vertical dimension of the restrained fluidization zone.

The gas produced according to this invention, being rich in carbon monoxide and hydrogen, may be used to synthesize methanol, gasoline or other organic compounds. It may also be processed to produce pure hydrogen for ammonia synthesis or for other chemical reactions. For substantially all end uses, the hydrogen-to-carbon monoxide ratio of the gasification product is too low, and a water-gas shift reaction will ordinarily follow the gasification process. The shift reaction: $H_2O+CO \rightarrow CO_2+H_2$ requires a large proportion of steam in the reactant gases, an amount considerably in excess of that normally present in the gasification product. Accordingly, the introduction of the carbonaceous feed material as a high density slurry in water is not a disadvantage. Rather, several advantages lie in utilizing a slurry feed. For one thing, a preferred raw material, anthracite silt, is available in slurry form; for this and other finely divided coal washery fractions, no dewatering and drying operations need be performed. A second advantage is the comparative ease and simplicity with which high pressure mud pumps can force a slurry into a pressurized reactor.

Depending upon the end use of the gaseous product, the gasification reactor may be operated at any desired pressure, usually not exceeding about 800 p. s. i. g. (pounds per square inch gauge). Gasification at pressures in the range of 250 to 500 p. s. i. g. is preferred.

The slurry feed is injected into the freely fluidized drying zone which is maintained at an elevated temperature to effect rapid vaporization of the water in the slurry, the solids in the slurry becoming part of the fluidized mass in the drying zone. The solids inventory in the drying zone must be correlated with the slurry feed rate to avoid pasting of the solids therein. This requires generally an inventory of about 0.5 to 3 pounds of fluidized solids per hourly pound of water fed to the drying zone with the slurry. The temperature of the fluidized drying zone is desirably maintained at a temperature of about 50 to 300° F. above the water dew-point of the gasification product. It is often advisable to preheat the slurry to approximately the temperature maintained in the drying zone before injection thereinto.

Substantially dry solids pass from the drying zone downwardly through the preheating zone countercurrent to the upflowing hot reaction gases from the gasification zones. As a consequence of the type of solids flow which is obtained under restrained fluidization, a temperature gradient is established in the preheating zone, with the top of this zone at approximately the temperature of the drying zone and its bottom at approximately the temperature of the primary gasification zone. The countercurrent transfer of high level heat energy from reaction gases to feed solids effected in the preheating zone is an important heat-saving feature which helps make the overall thermal efficiency of the gasification relatively high.

The hot carbonaceous solids discharging from the bottom of the preheating zone into the freely fluidized primary gasification zone are reacted with high-purity oxygen and steam to convert the major portion of their carbon content principally to hydrogen and carbon monoxide. Generally, the gasification temperature is in the range of about 1700 to 2500° F., and preferably in the range of about 1800 to 2000° F. The gasification temperature must obviously be selected to avoid fusion or agglomeration difficulties with the particular carbonaceous material undergoing gasification.

It is desirable to preheat the steam and oxygen charged to the primary gasification zone. Usually, the steam is preheated to about 1000° F. and the oxygen to about 400° F. In general, satisfactory gasification is attained by introducing into the primary gasification zone steam and oxygen in the respective molar ratio in the range of about 1.5:1 to 5:1, and preferably in the range of about 3:1 to 4:1.

The residence time of the solids in the primary gasification zone controls the carbon content of the solids. A high carbon content improves the conversion of oxygen to carbon monoxide while a low carbon content increases the conversion of oxygen to carbon dioxide. To achieve both high conversion of oxygen to carbon monoxide and high utilization of carbon, this invention limits the consumption of carbon in the primary gasification zone to about 65 to 95% by weight of the carbon initially in the feed solids. In terms of the whole gasification process, the major portion of the carbon is consumed in the primary gasification zone into which is directly injected a major portion of the oxygen and steam required by the process.

The limited top-to-bottom mixing of restrained fluidization in the secondary gasification zone tends to give localized high temperatures which are not disadvantageous within the limit set by the ash fusion temperature. In the secondary gasification zone, localized high temperatures below the ash fusion temperature and in any event below about 2500° F. are permitted to occur but excessive temperatures are prevented by the use of excess steam. For this purpose, the steam and oxygen are supplied to the secondary gasification zone in the respective molar ratio generally in the range of 7:1 to 15:1 and preferably in the range of 9:1 to 11:1. Because of the countercurrent flows of reactant gases and solids in the secondary gasification zone, it is feasible to carry the gasification to an extent that the solids leaving the bottom of the secondary gasification zone contain only a few percent by weight of residual carbon, usually not more than about 1 or 2%. These residual solids or, in effect ash is preferably passed in countercurrent contact with the major part of the steam supplied to the secondary gasification zone in order to cool the ash and superheat the steam. Thus, the ash may be discarded from the process at a low temperature of the order of 500° F.

The high-purity oxygen used in the process of this invention is generally obtained by the liquefaction and rectification of air and contains at least about 90%, preferably at least 95%, by volume of oxygen.

For further clarification of the invention, reference is made to appended drawing which schematically illustrates an apparatus suitable for carrying out the process.

Reactor 10 contains a freely fluidized drying zone 11, a preheat zone 12 of restrained fluidization, a freely fluidized primary gasification zone 13, a restrainedly fluidized secondary gasification zone 14, a freely fluidized mixing zone 15, and a restrainedly fluidized cooling zone 16. Reactor 10 has a solids discharge 17 and a product gas outlet 18. The zones of restrained fluidization 12, 14 and 16 are filled with suitable packing, e. g., 2-inch Raschig rings, as indicated by 12a, 14a and 16a and supported by foraminous members or perforated plates 12b, 14b and 16b, respectively. A slurry feed pipe 19 enters reactor 10 near the bottom of drying zone 11. One gasifying reactant feed pipe 20 enters near the bottom of primary gasification zone 13, another feed pipe 21 enters at mixing zone 15 and a third feed pipe 22 enters below cooling zone 16. The gases emerging at the pseudo-liquid level 23 of the fluidized mass in drying zone 11 pass through settling space 24 and cyclone separator 25 to remove the bulk of any entrained solid particles before discharging through outlet 18. Separated particles are returned from cyclone 25 through standpipe 26 to drying zone 11.

In a specific example of the operation of this process, a slurry of water and anthracite silt is pumped through pipe 19 into drying zone 11 operating at a pressure of 400 p. s. i. g. The slurry, on a weight basis, is half water and is charged at the of 1350 tons per day. Analysis of the anthracite silt shows an ash content of 29.8% by weight. The fluidized mass in drying zone 11 is 9 feet in diameter and 10 feet in depth and has a temperature of about 500° F. Preheat zone 12 is also 10 feet high while primary gasification zone 13 has a height of 30 feet, both having diameters of 9 feet. Secondary gasification zone 14 is 12 feet high and 5½ feet in diameter. Cooling zone 16 has a height of 8 feet and a diameter of 3 feet.

The dry silt gravitating down through preheat zone 12, countercurrent to the hot reaction gases, is preheated to a temperature approaching 1900° F. and then enters freely fluidized primary gasification zone 13 where 92% by weight of the carbon content of the silt is gasified at a temperature of about 1900° F. by steam and oxygen. The partially gasified solids having a carbon content of about 15% next pass down through secondary gasification zone 14 wherein the remaining carbon is substantially completely gasified by steam and oxygen. The resulting ash containing about 1% by weight of carbon passes down through cooling zone 16 and is discarded at a temperature of 500° F. through discharge 17. Saturated steam (455° F.) is introduced through pipe 22 at the daily rate of 113,000 pounds and mixes in zone 15 with 66,000 pounds of 1000° F. steam and 34,000 pounds of 400° F. oxygen (95% by volume purity) added through pipe 21. An additional 607,000 pounds of 1000° F. steam and 352,000 pounds of 400° F. oxygen (95% by volume purity) are introduced daily through pipe 20.

The total gaseous effluent at a temperature of about 500° F. is withdrawn through outlet 18 at a daily rate of 46 million standard cubic feet. The composition of the gaseous effluent, on a molar basis, is:

| | Percent |
|---|---|
| $H_2$ | 23 |
| CO | 19.5 |
| $CO_2$ | 9.5 |
| $H_2O$ | 47 |

In view of the various modifications of the invention which will occur to those skilled in the art upon con-

What is claimed is:

1. The process of continuously and completely gasifying finely divided carbonaceous solids wet with water by reaction with a mixture of oxygen and steam, which comprises introducing said solids wet with water into a freely fluidized bed of said solids in a drying zone, passing said solids from said drying zone down through a preheating zone of restrained fluidization wherein top-to-bottom mixing of said solids is impeded and said solids are preheated to an elevated temperature by contact with the hot gaseous products of gasification, passing said solids from said preheating zone to a freely fluidized primary gasification zone wherein a major portion of the carbon in said solids is gasified by reaction with oxygen and steam, passing the partially gasified solids from said primary gasification zone down through a secondary gasification zone of restrained fluidization wherein top-to-bottom mixing of said solids is impeded and substantially all of the carbon remaining in said solids is gasified by reaction with oxygen and steam, and introducing a minor portion of the oxgen and steam required for the gasification into said secondary gasification zone and the remaining major portion thereof into said primary gasification zone.

2. The process of claim 1 in which the gasification is conducted at a pressure in the range of about 250 to 500 p. s. i. g.

3. The process of claim 1 in which the steam and oxygen introduced into said primary gasification zone are in a respective molar ratio in the range of 1.5:1 to 5:1, while the steam and oxygen introduced into said secondary gasification zone are in a respective molar ratio in the range of 7:1 to 15:1.

4. The process of claim 3 in which at least the major part of the steam introduced into said secondary gasification zone is first preheated by countercurrent contact with the residual solids discharged from said secondary gasification zone.

5. The process of continuously and completely gasifying finely divided carbonaceous solids wet with water by reaction with a mixture of oxygen and steam, which comprises introducing said solids wet with water into a freely fluidized bed of said solids in a drying zone, passing said solids from said drying zone down through a preheating zone of restrained fluidization wherein top-to-bottom mixing of said solids is impeded and said solids are preheated to an elevated temperature by contact with the hot gaseous products of gasification, passing said solids from said preheating zone to a freely fluidized primary gasification zone wherein a major portion of the carbon in said solids is gasified by reaction with oxygen and steam, passing the partially gasified solids from said primary gasification zone down through a secondary gasification zone of restrained fluidization wherein top-to-bottom mixing of said solids is impeded and substantially all of the carbon remaining in said solids is gasified by reaction with oxygen and steam, passing the residual solids from said secondary gasification zone down through a cooling zone of restrained fluidization, wherein top-to-buttom mixing of said residual solids is impeded, in countercurrent contact with a minor portion of the steam required for the gasification, and introducing a minor portion of the oxygen required for the gasification together with said minor portion of the steam after said countercurrent contact into said secondary gasification zone and the remaining major portion of the oxygen and steam required for the gasification into said primary gasification zone.

6. A process for continuously gasifying finely divided carbonaceous solids by reaction with a mixture of oxygen and steam which comprises introducing a slurry of water and said solids into a freely fluidized bed of said solids wherein said water vaporizes, passing said solids from said bed down through a preheating zone of restrained fluidization wherein top-to-bottom mixing of said solids is impeded and said solids are preheated to an elevated temperature by contact with the hot gaseous products of gasification, passing said solids from the bottom of said preheating zone to a freely fluidized primary gasification zone wherein 65 to 95% of the carbon content of said solids is gasified by reaction with oxygen and steam, passing the partially gasified solids from said primary gasification zone down through a secondary gasification zone of restrained fluidization wherein top-to-bottom mixing of said solids is impeded and a predominent portion of the carbon content of said partially gasified solids is gasified by reaction with oxygen and steam, passing the residual solids from said secondary gasification zone down through a cooling zone in countercurrent contact with steam flowing to said secondary gasification zone, and introducing a minor portion of the oxygen required for the gasification into said secondary gasification zone and the remaining major portion of said oxygen and additional steam into said primary gasification zone.

7. The process of claim 6 in which the slurry is, on a weight basis, approximately half water and half anthracite silt and the fluidized bed into which said slurry is introduced is maintained at a temperature of the order of 500° F.

8. The process of claim 6 in which the residual solids leaving said cooling zone have a temperature of the order of 500° F. and contain not more than about 2% by weight of carbon.

9. The process of claim 6 in which the gasification is conducted at an elevated pressure not exceeding about 800 p. s. i. g.

References Cited in the file of this patent

UNITED STATES PATENTS

| | | |
|---|---|---|
| 2,552,866 | Ramseyer | May 15, 1951 |
| 2,579,398 | Roetheli | Dec. 18, 1951 |
| 2,588,076 | Gohr | Mar. 4, 1952 |
| 2,595,365 | Odell et al. | May 6, 1952 |
| 2,595,366 | Odell et al. | May 6, 1952 |
| 2,681,273 | Odell | June 15, 1954 |